US008077847B2

(12) United States Patent
Stroud et al.

(10) Patent No.: US 8,077,847 B2
(45) Date of Patent: Dec. 13, 2011

(54) DTMF LOCKOUT UTILITY USING EPOCH TIME STAMP

(75) Inventors: Kenneth Robert Stroud, Lago Vista, TX (US); Jeffrey Lewis Brandt, Cedar Park, TX (US); Rick Anthony Cherye, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 950 days.

(21) Appl. No.: 12/044,433

(22) Filed: Mar. 7, 2008

(65) Prior Publication Data

US 2008/0155005 A1      Jun. 26, 2008

Related U.S. Application Data

(63) Continuation of application No. 10/669,438, filed on Sep. 25, 2003, now Pat. No. 7,366,287.

(51) Int. Cl.
    *H04M 15/00*    (2006.01)
(52) U.S. Cl. .................. 379/111; 379/114.09; 708/100; 708/112
(58) Field of Classification Search .................. 379/111, 379/112.04, 114.09, 114.28, 100.13, 118, 379/128, 131; 708/100, 111, 112; 705/7; 707/200, 203
See application file for complete search history.

(56) References Cited

U.S. PATENT DOCUMENTS

| | | | |
|---|---|---|---|
| 4,852,030 A * | 7/1989 | Munday | 702/178 |
| 5,511,188 A | 4/1996 | Pascucci et al. | |
| 5,852,659 A | 12/1998 | Welter, Jr. | |
| 5,867,495 A | 2/1999 | Elliott et al. | |
| 6,112,085 A | 8/2000 | Garner et al. | |
| 6,195,697 B1 | 2/2001 | Bowman-Amuah | |
| 6,424,704 B1 | 7/2002 | Lee | |
| 6,424,711 B1 | 7/2002 | Bayless et al. | |
| 6,529,526 B1 * | 3/2003 | Schneidewend | 370/486 |
| 6,556,659 B1 | 4/2003 | Bowman-Amuah | |
| 6,803,866 B2 * | 10/2004 | Brown et al. | 341/90 |
| 2001/0048738 A1 | 12/2001 | Baniak et al. | |
| 2002/0085696 A1 | 7/2002 | Martin et al. | |
| 2004/0117221 A1 | 6/2004 | Beglen et al. | |
| 2004/0119617 A1 * | 6/2004 | Brown et al. | 341/90 |

* cited by examiner

*Primary Examiner* — Binh Tieu
(74) *Attorney, Agent, or Firm* — Greenblum & Bernstein, PLC

(57) ABSTRACT

A method for converting a first time and a first date in a first format to a second time in a second format includes determining a number of seconds that have elapsed between a predetermined date and a beginning of a current year of the first date. The method further includes adding to the determined number of seconds, a calculated number of seconds calculated from the beginning of the current year to a current month and a current day of the first date to obtain a first sum. The first sum varies based on whether the current month is within a leap year and is subsequent to a leap day of the leap year. A number of seconds that have elapsed between a beginning of the current day of the first date and the first time is added to the first sum. Lastly, a predetermined number of seconds is added to the first sum when Daylight Savings Time is in effect to obtain the second time in the second format.

20 Claims, 2 Drawing Sheets

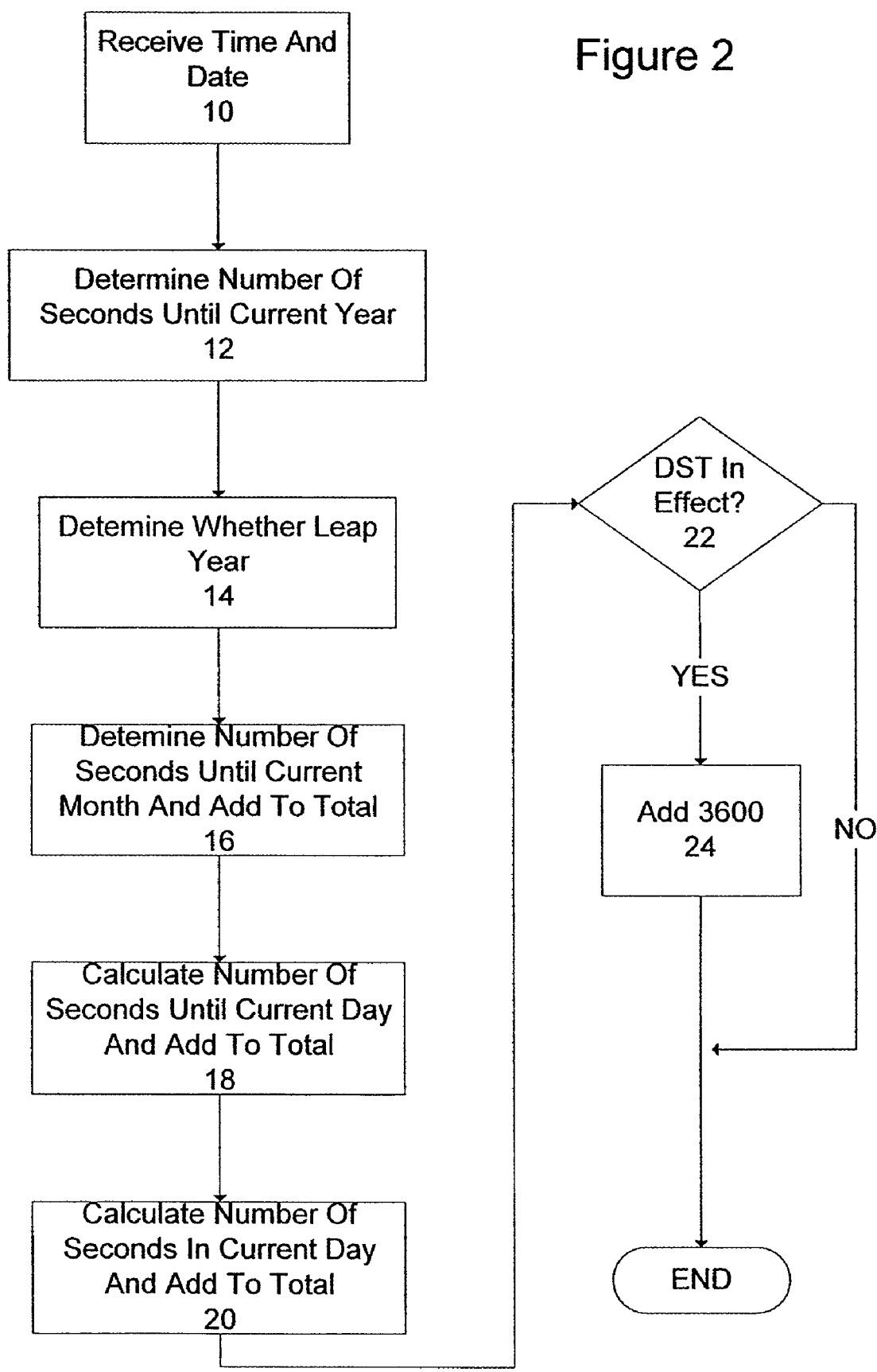

DTMF LOCKOUT UTILITY USING EPOCH TIME STAMP

This application is a continuation of pending U.S. patent application Ser. No. 10/669,438, filed Sep. 25, 2003, the disclosure of which is expressly incorporated herein by reference in its entirety.

BACKGROUND OF THE INVENTION

1. Field of the Invention

The present invention relates to the field of telecommunications. More particularly, the present invention relates to determining customer data availability by calculating elapsed time.

2. Background Information

Some advanced intelligent network (AIN) telecommunications services provide a customer with an ability to change customer data, such as a personal identification number (PIN), a telephone number screening list, service options, etc. Typically, in order to make these changes, the customer calls a particular telephone number to connect to an interactive voice response (IVR) that acts as an interface to an element of the telecommunications network, such as a service control point (SCP). The IVR interface is designed to handle multiple and simultaneous calls. The IVR plays pre-recorded announcements and instructs the caller to choose among various options via the touch tone pad. Reacting to the input of the caller, the IVR stores the requested changes in a subscriber's call processing record (CPR) or database table that resides on the SCP. These changes take effect immediately and are available for immediate use by AIN service logic.

For example, a subscriber to an Outgoing Call Control (OCC) service, an AIN service, dials a ten digit OCC update number. A voice tells him to enter the phone number and pin number of the phone that is equipped with the OCC service. After entering the phone number and correct pin, the voice asks the caller to choose among a number of options. As an example, the voice might ask him to enter the number two on the touch tone pad to change the PIN. After entering the two, the customer is instructed to choose a new PIN. Immediately after successfully entering the new PIN and confirmation of the desired change, the new PIN becomes the active PIN.

A problem with this method of customer change involves multiple users updating the same subscriber data. Whenever more than one person has the capability to change a particular subscriber's data, it is always possible that two or more authorized persons might try to initiate changes at the same time. An instance of this might be when two members of a household attempt to add non-restricted exception numbers to the Outgoing Call Control database. Simultaneous changes could have negative results on the subscriber's database. For this reason, a method is needed for "locking out" all but the first of the callers. By locking the subscriber's database during a (dual tone multi-frequency) DTMF update, subsequent callers are prevented from entering conflicting data until the first caller has finished.

A system must also allow for users that abandon the call after their database becomes tagged as "in use". The tag must be removed after the successful DTMF update and a timer must be used to allow the logic to know that the "in use" tag is no longer valid. Typically, the system sets a duration or time limit to ignore the "in use" switch if the date and time of the last update has passed.

In the current system, a Call Processing Record (CPR) that resides on a service control point (SCP) includes logic that examines the values of an "in use" flag, along with the time and date that flag was last updated and a number of time-out minutes, to determine whether a CPR is in use. If the "in use" flag is set to yes and the timer has not expired, callers will not be allowed to access the data until the current caller has finished updating or the timer expires. If the number of time-out minutes has expired since the flag was last updated, then: the flag is cleared (in use=No); the time and date are reset to the current time and date; and the return value indicates that the service logic should proceed as if the in use flag had not been set.

Currently, logic determines if the time out duration has expired by: comparing the current Gregorian date with the last update Gregorian date and subtracting the current time from the (last update time+the maximum lockout period). Problems arise if DTMF updates are made and the lockout period falls into the next day, i.e., just before midnight. When this happens special logic determines if the call should be locked from DTMF update. Furthermore, daylight savings time is not accounted for by the current method.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 2 is a flow diagram showing an exemplary flow for calculating a number of elapsed seconds, according to an aspect of the present invention.

DETAILED DESCRIPTION OF EMBODIMENTS

Figure 1:
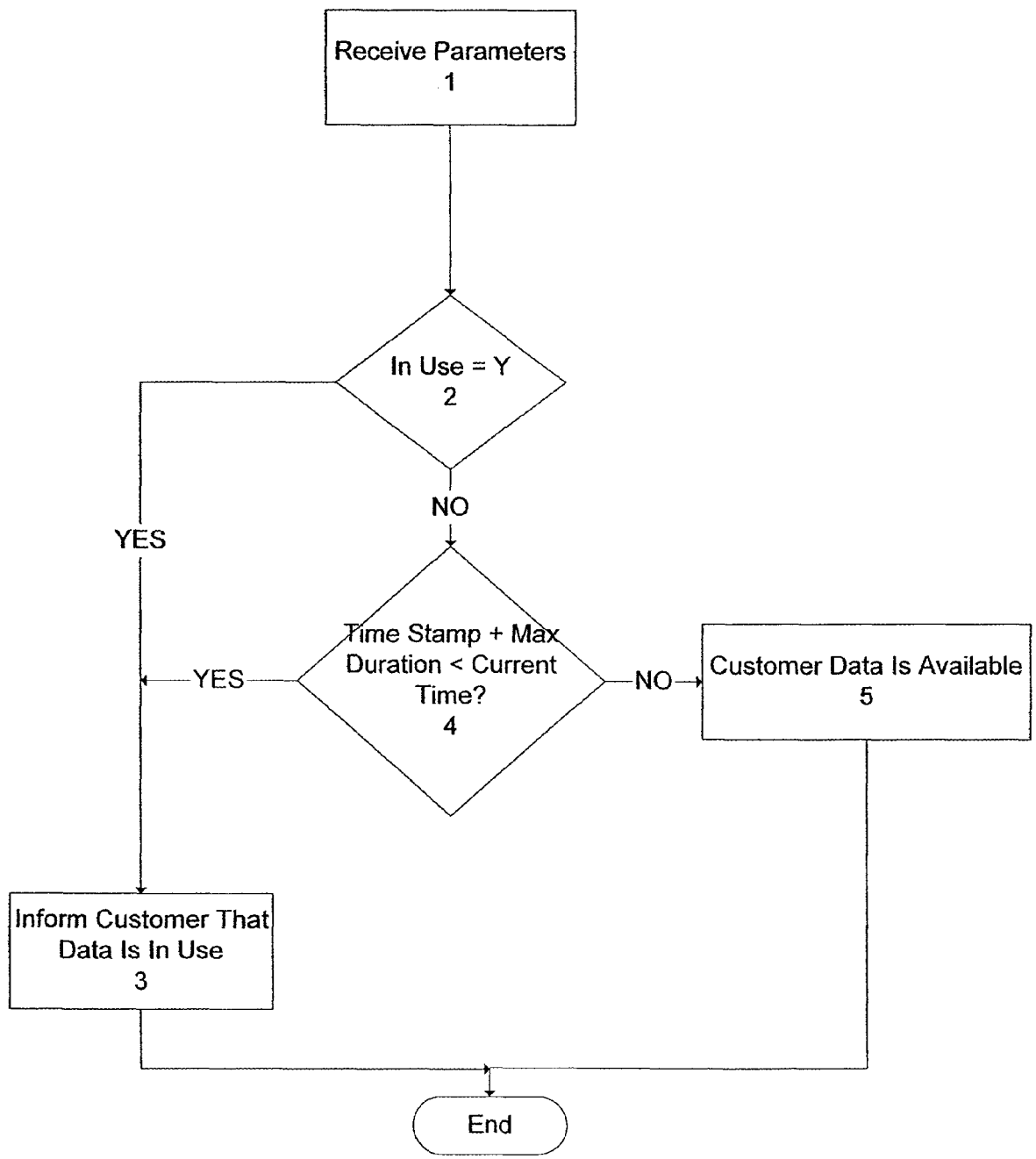
FIG. 1 is a flow diagram showing an exemplary flow for determining whether data is available, according to an aspect of the present invention.

The present invention solves the problem of simultaneous DTMF updates to the same set of subscriber data. Also, the present invention compensates for Daylight Savings Time and is, therefore, reliable during those two periods in which the time is adjusted by one hour each year. This invention addresses and eliminates the problems caused by Daylight Savings time when calculating elapsed time between DTMF updates.

In view of the above, the present invention through one or more of its various aspects and/or embodiments is presented to accomplish one or more objectives and advantages, such as those noted below.

According to an aspect of the present invention, a method is provided for converting a current time and a Gregorian date, including a current year, a current month, and a current day, into an epoch time stamp. The method includes receiving the current time and the Gregorian date, and determining a number of seconds that have elapsed since a predetermined date up until, but not including, the current year. The method also determines whether the current year is a leap year, and determines a number of seconds that have elapsed since the beginning of the current year up until, but not including, the current month, based on whether the current year is a leap year. The method further calculates a number of seconds that have elapsed since the beginning of the current month up until, but not including, the current day, and calculates a number of seconds that have elapsed during the current day.

The determined number of seconds since the predetermined date, the determined number of seconds since the beginning of the current year, the calculated number of seconds since the beginning of the current month, and the calculated number of seconds during the current day are summed to obtain a converted time. Finally, it is determined whether Daylight Savings Time is in effect. When Daylight Savings Time is not in effect, 3600 seconds are added to the converted time. Thus, the converted time is the epoch time stamp indicating the number of elapsed seconds since the predetermined time.

In one embodiment, the determining a number of seconds that have elapsed since a predetermined date up until, but not including, the current year further comprises looking up the number of seconds in a table. In another embodiment, the determining whether the current year is a leap year requires comparing the current year with a table of leap years. In another embodiment, the determining a number of seconds that have elapsed since the beginning of the current year requires looking up the number of seconds in a table, which may include a column for leap year values, and a column for non-leap year values.

Determining whether Daylight Savings Time is in effect may include storing a current system time; changing a current system time zone to a current system time zone without Daylight Savings Time; obtaining a new system time using the current time zone without Daylight Savings Time; and comparing the new system time with the stored system time. When the new time differs from the stored time, it is determined that Daylight Savings Time is in effect.

In another aspect of the present invention, a method is provided for determining customer data availability. The method includes receiving a time stamp of a most recent update. The time stamp is a number of elapsed seconds since a predetermined date and a predetermined time. The method also includes determining whether the customer data is in use, and receiving a maximum duration of a lockout period. The maximum duration of the lockout period, the time stamp, and whether the customer data is in use are analyzed to determine whether the customer data is available.

The analyzing may include determining whether the sum of the time stamp and the maximum duration of the lockout period is greater than a current time. In this case, when the sum is greater than the current time, the customer data is not available. When the sum is less than or equal to the current time, the customer data is available. If the customer data is available, time stamp is replaced with a current time stamp and the customer data is indicated to be in use.

According to an embodiment of the present invention, a new custom node determines whether or not a CPR is in use. The new decision node provides for a cleaner and more understandable interface for the service logic designer. It also accounts for Daylight Savings Time. This node is inserted at the appropriate place in the service logic for the DTMF update CPR.

Referring to FIG. 1, at step 1 parameters are received. The parameters include a time stamp of the last DTMF update. The time stamp is the number of seconds since an arbitrary date, e.g., Jan. 1, 1970 00:00 GMT, as discussed in more detail below. Another parameter is an In Use Y/N call variable. Y means that the customer's data is in the process of being updated. The parameters also include a maximum duration of a lockout period in minutes.

After the parameters are received and the service logic is invoked, the logic analyzes the time stamp of the customer's last update, along with the In Use switch and maximum lockout duration time to determine whether or not to allow customer change. For example, the logic may determines if both the time stamp and lockout duration are valid. As shown at step 2, the logic determines if the In Use flag is set to "Y".

If the In Use flag does not equal Y, at step 5 the customer will be allowed to proceed with updating, the time stamp is replaced with the current time stamp, the in-use flag is set to "Y" and then the logic ends. If the In Use variable is set to Y, at step 4 it is determined if the time stamp+the lockout duration is less than or greater than the current time.

If the time stamp+the lockout duration is greater than the current time, the DTMF process will not be allowed to occur, and at step 3 an announcement can be played to the caller asking him to try back at a later time. If the time stamp+the lockout duration is less than the current time, the DTMF process will be allowed to occur, the time stamp is replaced with the current time stamp, and the In Use flag is set to "Y" at step 5. Subsequently, the logic ends, and if the caller has not prematurely abandoned the call, the In Use flag is set to "N".

The present invention is intended to make the process of determining customer data availability simpler and more reliable for the service developer. One advantage is to ensure that customers are allowed to change their AIN service data in a safe and reliable fashion.

In order for this new user interface and method of calculating elapsed time to be compatible with older time stamps, another aspect of the present invention converts a Gregorian date and time into a time stamp representing the number of seconds elapsed since an arbitrary time and date.

Referring to FIG. 2, an explanation of exemplary logic will now be described.

Initially, at step 10 the Gregorian date to be converted is received. An exemplary format includes a two digit month, a two digit day, and a four digit year, i.e., MM/DD/YYYY. The time to be converted is also received at step 10. An exemplary format is two digits for hours and two digits for minutes, i.e., HH:MM.

Next, at step 12 the number of seconds that have elapsed up to but not including the current year is determined. In one embodiment, the number of seconds is retrieved from a table. An exemplary table is shown as Table 1.

TABLE 1

| YEAR | SECONDS |
|------|---------|
| 1970 | 0 |
| 1971 | 31536000 |
| 1972 | 63072000 |
| 1973 | 94694400 |
| 1974 | 126230400 |
| 1975 | 157766400 |
| 1976 | 189302400 |
| 1977 | 220924800 |
| ... | ... |

At step 14, it is determined if the current year is a leap year. In one embodiment, a table that contains all leap years from 1970 to 2030, i.e., 1972, 1976, 1980, 1984 . . . , is searched.

At step 16, the number of seconds that have elapsed in the current year, up to but not including the current month is determined, based on whether the current year is a leap year. In one embodiment, the number of seconds is retrieved from a table having several columns, including one column for non leap years and another column for leap years. An exemplary table is shown as Table 2. The column SECONDS is for non leap years and the column LSECONDS is for leap years. Subsequently, the retrieved number of seconds is added to the total number of elapsed seconds up to the current year.

TABLE 2

| MONTH | SECONDS | LSECONDS |
|---|---|---|
| 1 | 0 | 0 |
| 2 | 2678400 | 2678400 |
| 3 | 5097600 | 5184000 |
| 4 | 7776000 | 7862400 |
| 5 | 10368000 | 10454400 |
| etc. | ... | ... |

At step 18, the number of seconds up to but not including the current day of the month is calculated. The calculation multiplies the date by 24*60*60. Subsequently the calculated value is added to the number already stored.

At step 20, the current time is used to calculate the elapsed seconds for the converted day. The calculation multiplies the hour by 3600 and the minutes by 60. Those numbers are added to the number already stored.

At step 22 it is determined whether or not Daylight Savings time is in effect. More specifically, the current time is stored and then the system time is changed to the current time zone not observing Daylight Savings Time. For example, Central Daylight Savings Time would become Central Standard Time. In another example, Central Standard Time would remail Central Standard Time. The new time (after changing the system time) is then compared with the stored time to see whether they are the same. If not, Daylight Savings Time is in effect.

If Daylight Savings Time is not in effect, at step 24 3600 seconds are added to the final number to obtain the exact number of elapsed seconds since the predetermined time. Otherwise, the sum of the seconds is the exact number of elapsed seconds since the predetermined time.

It is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission and public telephone networks represent examples of the state of the art. Such standards are periodically superseded by faster or more efficient equivalents having essentially the same functions. Accordingly, replacement standards and protocols having the same functions are considered equivalents.

What is claimed is:

1. A method, implemented on a computer, for converting a first time and a first date in a first format to a second time in a second format, comprising:

determining a number of seconds that have elapsed between a predetermined date and a beginning of a current year of the first date;

adding to the determined number of seconds, a calculated number of seconds calculated from the beginning of the current year to a current month and a current day of the first date to obtain a first sum that varies based on whether the current month is within a leap year and subsequent to a leap day of the leap year; and adding to the first sum, an elapsed number of seconds between a beginning of the current day of the first date and the first time, and a predetermined number of seconds when Daylight Savings Time is in effect, to obtain the second time in the second format.

2. The method according to claim 1,
   wherein the first sum varies 86400 seconds depending on whether the current month is within the leap year and subsequent to the leap day of the leap year.

3. The method according to claim 1,
   wherein the first format comprises a Gregorian date format.

4. The method according to claim 1,
   wherein the second format comprises an epoch timestamp format.

5. The method according to claim 1,
   wherein the predetermined number of seconds comprises 3600 seconds.

6. The method according to claim 1, further comprising:
   determining availability of data based on an indication of whether the data is in use and based on a sum of the second time and a duration of a maximum lockout period for the data,
   wherein the second time corresponds to a most recent update to the data.

7. A method for determining data availability, comprising:
   obtaining a first time and a first date corresponding to a most recent update of the data;
   converting the first time and the first date from a first format to a second time in a second format; and
   determining whether the data is available based on an indication of whether the data is in use, and a sum of the second time in the second format and a maximum duration of a lockout period for the data.

8. The method according to claim 7,
   wherein converting comprises determining a number of seconds that have elapsed between a predetermined date and a beginning of a current year of the first date;
   adding to the determined number of seconds, a calculated number of seconds calculated from the beginning of the current year to a current month and a current day of the first date to obtain a first sum that varies based on whether the current month is within a leap year and subsequent to a leap day of the leap year; and adding to the first sum, an elapsed number of seconds between a beginning of the current day of the first date and the first time, and a predetermined number of seconds when Daylight Savings Time is in effect, to obtain the second time in the second format.

9. The method according to claim 7,
wherein the data is stored in a database in a telecommunications network.

10. The method according to claim 7,
wherein the data comprises at least one of a personal identification number (PIN), a communication address screening list and service options.

11. The method according to claim 7,
wherein a user accesses the data using an interactive voice system.

12. The method according to claim 7,
wherein the data is available for access by a user when the indication indicates the data is not in use.

13. The method according to claim 7,
wherein a user is locked out from accessing the data when the indication indicates the data is in use and the sum of the second time in the second format and the maximum duration of the lockout period for the data is greater than an access date and an access time at which the user attempts to access the data.

14. The method according to claim 13,
wherein the access date and the access time is formatted according to the second format.

15. The method according to claim 7,
wherein the data is available for access by a user when the indication indicates the data is in use and the sum of the second time and the maximum duration of the lockout period for the data is either less than or equal to an access date and an access time at which the user attempts to access the data.

16. The method according to claim 15,
wherein the indication is reset to indicate the data is in use when the user accesses the data.

17. The method according to claim 15,
wherein the first time and the first date are updated to reflect the access date and the access time, and
wherein the access date and the access time are converted to the second format for comparison with the sum of the second time and the maximum duration of the lockout period.

18. A computer readable medium storing a program, recorded on the computer readable medium, for converting a first time and a first date in a first format to a second time in a second format, comprising:
a determining code, recorded on the computer readable medium, executable to determine a number of seconds that have elapsed between a predetermined date and a beginning of a current year of the first date;
a first adding code, recorded on the computer readable medium, executable to add to the determined number of seconds, a calculated number of seconds calculated from the beginning of the current year to a current month and a current day of the first date to obtain a first sum that varies based on whether the current month is within a leap year and subsequent to a leap day of the leap year; and
a second adding code, recorded on the computer readable medium, executable to add to the first sum, an elapsed number of seconds between a beginning of the current day of the first date and the first time, and a predetermined number of seconds when Daylight Savings Time is in effect, to obtain the second time in the second format.

19. A computer readable medium storing a program, recorded on the computer readable medium, for determining data availability, comprising:
a obtaining code, recorded on the computer readable medium, executable to obtain a first time and a first date corresponding to a most recent update of the data;
a converting code, recorded on the computer readable medium, executable to convert the first time and the first date from a first format to a second time in a second format; and
a determining code, recorded on the computer readable medium, executable to determine whether the data is available based on an indication of whether the data is in use, and a sum of the second time in the second format and a maximum duration of a lockout period for the data.

20. The computer readable medium according claim 19,
wherein the data comprises communication data for a user in a communications network.

* * * * *